(12) United States Patent
Kramer

(10) Patent No.: US 7,005,021 B2
(45) Date of Patent: Feb. 28, 2006

(54) METHOD OF FORMING AND ADHESIVELY BONDED SEAM

(75) Inventor: Paul Frederick Kramer, Berkeley, CA (US)

(73) Assignee: Mountain Hardwear, Inc., Richmond, CA (US)

(*) Notice: Subject to any disclaimer, the term of this patent is extended or adjusted under 35 U.S.C. 154(b) by 0 days.

(21) Appl. No.: 10/851,409

(22) Filed: May 21, 2004

(65) Prior Publication Data

US 2005/0230026 A1    Oct. 20, 2005

Related U.S. Application Data

(60) Provisional application No. 60/472,159, filed on May 21, 2003.

(51) Int. Cl.
*B32B 31/16* (2006.01)

(52) U.S. Cl. .................. 156/73.4; 156/157; 156/272.2; 428/57

(58) Field of Classification Search ............... 156/73.1, 156/73.4, 157, 272.2, 379.6, 502, 580.1, 156/580.2; 428/57
See application file for complete search history.

(56) References Cited

U.S. PATENT DOCUMENTS

| | | | | |
|---|---|---|---|---|
| 2,115,368 A | * | 4/1938 | Lustberg | ...................... 428/57 |
| 2,435,509 A | | 2/1948 | Pfeffer, Jr. et al. | |
| 2,985,555 A | | 5/1961 | Sherbrook | |
| 4,156,293 A | | 5/1979 | Off | |
| 4,357,197 A | | 11/1982 | Wilson | |
| 4,365,355 A | | 12/1982 | Off | |
| 4,461,662 A | * | 7/1984 | Onishi | ...................... 156/73.4 |
| 4,523,336 A | | 6/1985 | Truman | |
| 4,605,578 A | * | 8/1986 | Emrich et al. | ................. 428/57 |
| 4,670,073 A | * | 6/1987 | Langley | ..................... 156/73.1 |
| 4,706,316 A | | 11/1987 | Tanzi | |
| 4,737,212 A | | 4/1988 | Emrich et al. | |
| 4,906,497 A | | 3/1990 | Hellmann et al. | |
| 5,336,346 A | | 8/1994 | Meltzer et al. | |
| 5,340,649 A | | 8/1994 | Roeker et al. | |
| 5,885,679 A | * | 3/1999 | Yasue et al. | .................. 428/57 |
| 6,079,343 A | | 6/2000 | Wong | |
| 6,114,676 A | | 9/2000 | Jerby et al. | |
| 6,375,770 B1 | | 4/2002 | Meltzer et al. | |
| 6,471,803 B1 | | 10/2002 | Polland, et al. | |
| 6,497,934 B1 | * | 12/2002 | Mahn et al. | .................. 428/57 |
| 6,558,809 B1 | | 5/2003 | Kelch et al. | |
| 6,694,528 B1 | | 2/2004 | Chang | |
| 6,797,352 B1 | | 9/2004 | Fowler | |

(Continued)

FOREIGN PATENT DOCUMENTS

GB    2 071 564    9/1981

(Continued)

*Primary Examiner*—James Sells

(57) ABSTRACT

A method of forming a stitchless, adhesively bonded seam for a garment includes positioning an outside surface of a first sheet of fabric adjacent to an outside surface of a second sheet of fabric, and positioning a first strip of adhesive tape between the first and second sheets of fabric. A second strip of adhesive tape is positioned such that a first side is adjacent to a first portion of an inside surface of the second sheet of fabric, and the second sheet of fabric is folded such that a second portion of the inside surface of the second sheet of fabric overlaps a second side of the second strip of adhesive tape. The adhesively bonded seam is formed by applying energy to the first and second sheets of fabric and to the first and second strips of adhesive tape.

33 Claims, 3 Drawing Sheets

U.S. PATENT DOCUMENTS

| | | |
|---|---|---|
| 2003/0075258 A1 | 4/2003 | Zhang et al. |
| 2003/0126673 A1 | 7/2003 | Yardley |
| 2005/0022920 A1 | 2/2005 | Fowler |

FOREIGN PATENT DOCUMENTS

| | | |
|---|---|---|
| JP | 2002-242014 | 8/2002 |

* cited by examiner

METHOD OF FORMING AND ADHESIVELY BONDED SEAM

The invention disclosed in this nonprovisional patent application was previously disclosed in provisional application, No. 60/472,159, filed on May 21, 2003, and applicant claims the benefits of the earlier filing date.

FIELD OF THE INVENTION

The present invention generally relates to methods of forming a seam for a garment by joining sheets of fabric together using an adhesive.

BACKGROUND

For many years sewing machines have been used to join sheets of fabric together by basically tying the sheets together with thread. Recently, garment manufacturers have started joining sheets of fabric together by welding overlapping edges using heat and pressure. When heat is applied, the overlapping portions of the fabric melt and fuse together forming a seam. This method works well with thermoplastic materials, but less well with woven fabrics. Fabrics are composed of small fibrous materials and when they are heated the fibers become brittle. As a result, the strength and flexibility of the small fibers is compromised. When a tensile force is applied to the seam, the weld is easily broken.

In addition to creating seams using welding techniques, some manufactures have started to join fabric together using adhesive. The basic technique utilizes a strip of adhesive or glue tape, which is positioned between overlapping sheets of fabric. Pressure and heat are then applied to the overlapping fabric and adhesive tape, which generates heat and melts the tape. The adhesive then forms an adhesive bond, joining the overlapping fabric surfaces and, thus, forming an adhesively bonded seam. Although gluing fabric together has been a commercially successful way of manufacturing garments, the completed product exhibits several limitations, depending upon the manner of joining the fabric and the type of fabric used. As illustrated in FIG. 1, if the fabric is joined "face-to-face", like in a standard sewn seam, the resulting glued seam will separate and fail when a tensile force F of sufficient magnitude is applied to the fabric at an angle to the seam. In the figure, the force F is shown at an angle of approximately 90° to the surface of the seam, which is typical of this type of seam. The seam fails due to the fact that the tensile force F is applied at an angle to the seam, and when the angle is approximately 90°, the force is primarily concentrated at the outside or face end of the seam, causing the seam to separate or peel apart.

Another type of adhesively bonded seam, as illustrated in FIG. 2, is typically formed by overlapping and joining the outside or facing surface of a sheet of fabric to the inside or backing surface of another sheet of fabric. In this instance, the resulting glued seam is stronger because most tensile forces are applied approximately parallel to the seam. However, there are problems with this type of seam. One problem is that the seam has a "raw edge" on the outside or face surface of the garment, and the raw edge easily unravels in normal use. The other problem is that the technique does not work well when the outside or facing surface and the inside or backing surface have different tensile strengths. For example, many modern fabrics have a laminate structure with a waterproof facing fabric, having a high tensile strength, on the outside surface and a knit backing fabric, having a relatively low tensile strength, on the inside surface. When a tensile force F of sufficient magnitude is applied to the fabric at an angle to the seam, or even parallel to the seam, the inner backing fabric is prone to separate from the outer face fabric, and the garment is ruined.

The present invention provides a glued seam and a method of forming a adhesively bonded seam, which overcomes these limitations of conventional seams.

SUMMARY OF THE INVENTION

The present invention provides an improved method of forming a stitchless, adhesively bonded seam, which joins two sheets of fabric together. The method includes providing a first and second sheet of fabric with each sheet having an outside or facing surface, an inside or backing surface, and an edge. The outside surface and edge of the first sheet of fabric are positioned adjacent to the outside surface and edge of the second sheet of fabric, respectively. A first strip of adhesive tape, having first and second sides and an edge, is positioned between the first and second sheets of fabric such that the edge of the first strip of adhesive tape is adjacent to the edges of the first and second sheets of fabric, and the first and second sides of the first strip of adhesive tape are adjacent to the outside surfaces of the first and second sheets of fabric, respectively. A second strip of adhesive tape, having first and second sides and an edge, is positioned such that its edge and first side are adjacent to the edge of the second sheet of fabric and to a first portion of the inside surface of the second sheet of fabric, respectively. The second sheet of fabric is folded such that a second portion of the inside surface of the second sheet of fabric overlaps the second side of the second strip of adhesive tape. The adhesively bonded seam is formed by applying ultrasonic pressure to the first and second sheets of fabric and to the first and second strips of adhesive tape, causing the first strip of adhesive tape to join the outside surfaces of the first and second sheets of fabric and the second strip of adhesive tape to join the first and second portions of the inside surface of the second sheet of fabric.

DETAILED DESCRIPTION OF THE INVENTION

Figure 3:
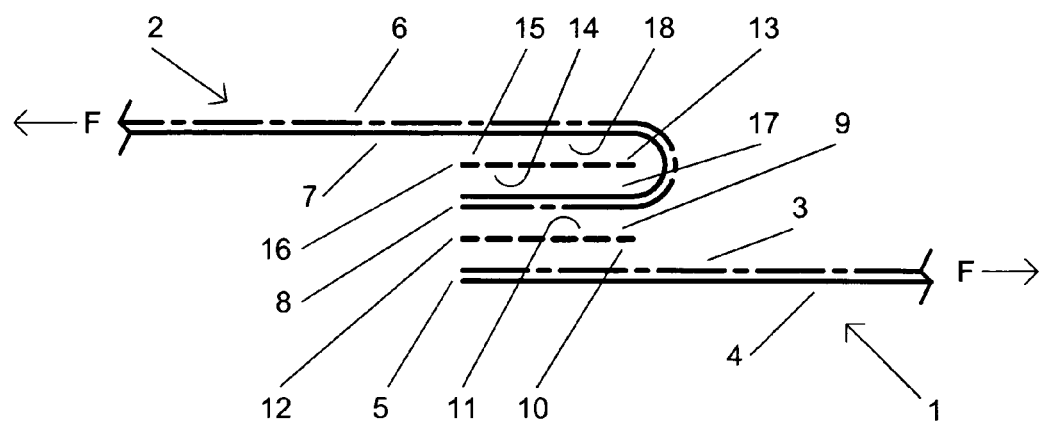
FIG. 3 is a pictorial diagram of a cross-sectional view of the adhesively bonded seam of the present invention.

The present invention is now described by reference to the figures. FIG. 3 illustrates the present invention's preferred embodiment of the method of forming a stitchless, adhesively bonded seam for a garment. As used in this description, "stitchless" means a seam that is not sewn using stitches. A first sheet of fabric 1 has an outside or facing surface 3 (depicted as a solid and dashed line), an inside or backing surface 4 (depicted as a solid line), and an elongate edge 5. Similarly, a second sheet of fabric 2 has an outside or facing surface 6 (depicted as a solid and dashed line), an inside or backing surface 7 (depicted as a solid line), and an elongate edge 8. The outside surface 3 and edge 5 of the first sheet of fabric are positioned adjacent to the outside surface 6 and edge 8 of the second sheet of fabric, respectively. A first strip of elongate adhesive tape 9, having a first and second sides 10 and 11, respectively, and an edge 12, is positioned between the first and second sheets of fabric, 1 and 2, respectively, such that the edge 12 of the first strip of adhesive tape is adjacent to the edges 5 and 8 of the first and second sheets of fabric, and the first side 10 of the first strip of adhesive and second side 11 of the first strip of adhesive tape are adjacent to the outside surface 3 of the first sheet of fabric and the outside surface 6 of the second sheet of fabric, respectively. A second strip of elongate adhesive tape 13, having first and second sides 14 and 15, respectively, and an edge 16, is positioned such that its edge 16 and first side 14 are adjacent to the edge 8 of the second sheet of fabric and to a first portion 17 of the inside surface 7 of the second sheet of fabric, respectively. The second sheet of fabric 2 is folded such that a second portion 18 of the inside surface 7 of the second sheet of fabric overlaps the second side 15 of the second strip of adhesive tape. The adhesively bonded seam is formed by utilizing an ultrasonic welding machine, such as a Sonobond® machine, to apply ultrasonic sound pressure to the first and second sheets of fabric 1 and 2, respectively, and to the first and second strips of adhesive tape 9 and 13, respectively. The ultrasonic sound pressure increases the temperature of the first strip of adhesive tape 9 until it melts, which forms an adhesive bond joining the outside surfaces 3 and 6 of the first and second sheets of fabric, respectively. Similarly, the ultrasonic sound pressure increases the temperature of the second strip of adhesive tape 13 until it melts, which forms another adhesive bond joining the first and second portions 17 and 18, respectively, of the inside surface 7 of the second sheet of fabric.

An alternative method of applying the ultrasonic sound pressure is to apply the pressure in two steps rather that the one step described above. In this instance, after the first strip of adhesive tape 8 is positioned between the first and second sheets of fabric, 1 and 2, as describe in connection with FIG. 3, ultrasonic sound pressure is applied to the assembly forming an adhesive bond between the first and second sheets of fabric. Then, after the second strip of adhesive tape 13 is positioned between the first and second portions, 17 and 18, of the second strip of adhesive tape, ultrasonic sound pressure is applied to this assembly forming an adhesive bond between the first and second portions, 17 and 18, of the second sheet of fabric. Further, it will obvious to those skilled in the art that the present invention includes an order of assembly which is the reverse of the order of assembly described in connection with the preferred embodiment.

Figure 1:
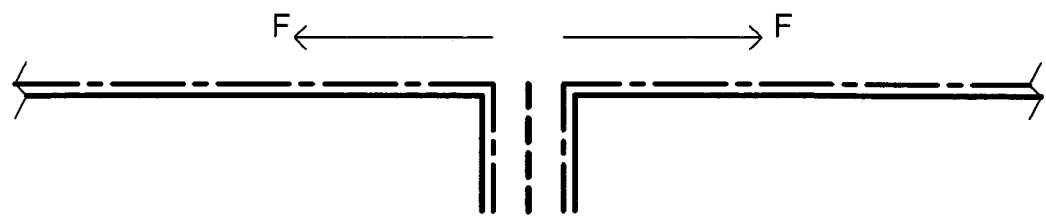
FIG. 1 (PRIOR ART) is a pictorial diagram of a cross-sectional view of two sheets of fabric that have been adhesively bonded together after positioning the outside or facing surface of each sheet in a face-to-face orientation.
Figure 2:
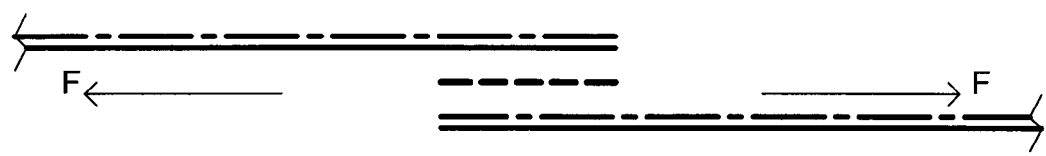
FIG. 2 (PRIOR ART) is a pictorial diagram of a cross-sectional view of two sheets of fabric that have been adhesively bonded together after overlapping the outside or facing surface of one sheet and the inside or backing surface of the other sheet.

The present invention is a substantial improvement over conventional seams. As illustrated in FIG. 1, a conventional, adhesively bonded seam is formed by joining the outside or facing surfaces of sheets of fabric in a "face-to-face" orientation, which creates a seam surface which is generally perpendicular to the sheets of fabric. As shown in the figure, when a tensile force F is applied in a direction generally parallel or even obliquely (not shown) to the sheets of fabric, which is typical of the forces applied to the fabric in garments and other articles, the adhesively bonded seam will fail by separating or peeling apart when the force F reaches a certain critical magnitude. The seam fails because the same force F which is generally parallel or oblique to the fabric is also either perpendicular or oblique to the seam surface and is concentrated where the seam surface forms an angle to the facing and backing surfaces of the fabric. Another type of conventional, adhesively bonded seam is formed, as shown in FIG. 2, by overlapping and adhesively bonding the outside or facing surface of a sheet of fabric to the inside or backing surface of another sheet of fabric. Depending on the type of fabrics that are being joined, this seam may be stronger than the seam illustrated in FIG. 1 because the tensile force F will generally be parallel to the sheets of fabric and, similarly, parallel to the seam surface. This seam's potential increase in strength is severally comprised, however, when the outside or facing surface and inside or backing surface of the fabrics being joined have different tensile strengths. For example, many modern fabrics have a laminate structure with a waterproof backing fabric, having a high tensile strength, on the inside surface of the laminated fabric, and an abrasion resistant facing fabric, having a relatively low tensile strength, on the outside surface of the laminated fabric. As shown in FIG. 2, when a tensile force F of sufficient magnitude is applied generally parallel, or at an oblique angle, to the seam, the facing fabric having the lower tensile strength will "give" or stretch relative to the bond between the facing fabric and the backing fabric and will similarly stretch relative to the backing fabric, causing the seam to fail. The present invention overcomes this limitation, and others, by providing a seam that substantially reduces the tendency of the facing fabric to stretch relative to the bond between the fabric layers and relative to the backing layer. Generally, the invention accomplishes this result by eliminating the adhesive bonds between the two surfaces with different tensile strengths. As shown in FIG. 3, the adhesive tape 9 bonds the outside or facing surfaces of the two sheets of fabric, and the adhesive tape 13 bonds the fabrics' inside or backing surfaces. As a result, the present invention essentially eliminates the tendency of the facing surface to stretch relative to the bond because adhesive tape 9 bonds one facing fabric to another identical facing fabric. When a force F is applied generally parallel, or at an oblique angle to the seam, both facing fabrics will stretch approximately the same amount and in the same direction; thus eliminating any stretching of facing fabric relative to the bond. And, the facing surface cannot now stretch relative to the backing surface because the backing surface is no longer bonded to the facing surface.

Further, due to the unique manner in which the second sheet of fabric 2 is folded, the tensile force F is generally parallel to the seam surface; thus, the force is distributed across the entire surface area of the seam. This force distribution should be distinguished from the force, illustrated in FIG. 1, which is approximately perpendicular to the seam and concentrated along the seam line where it joins the facing and backing surfaces of the fabric.

Another drawback to the conventional seam shown in FIG. 2 is that by merely overlapping the two sheets of fabric a seam is created which has an exposed or raw edge on the outside or facing surface of the garment's fabric. Unfortunately, the raw edge has a tendency to unravel due the fact that it is exposed to abrasive forces on the outside of the garment. Once again, the present invention overcomes this limitation by providing seam which does not have a raw edge on the outside surface of the garment.

Figure 4:
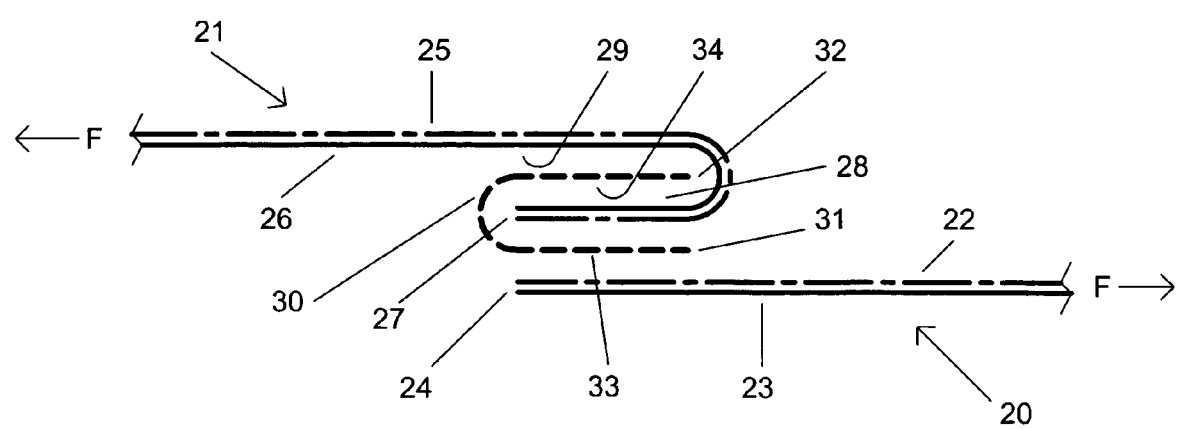
FIG. 4 is a pictorial diagram of a cross-sectional view of an alternative embodiment of the adhesively bonded seam of the present invention.

An alternative embodiment of the present invention is illustrated in FIG. 4. In this embodiment, a single strip of adhesive tape is utilized to form a seam, which has the same functional characteristics as the seam of the preferred embodiment. A first sheet of fabric 20 has an outside or facing surface 22 (depicted as a solid and dashed line), an inside or backing surface 23 (depicted as a solid line), and an elongate edge 24. Similarly, a second sheet of fabric 21 has an outside or facing surface 25 (depicted as a solid and dashed line), an inside or backing surface 26 (depicted as a solid line) and an elongate edge 27. The adhesively bonded seam is formed by folding the second sheet of fabric 21 such that a first portion 28 of the inside surface 26 of the second sheet of fabric 21 is opposite from a second portion 29 of the inside surface 26 of the second sheet of fabric 21. A single strip of elongate adhesive tape 30 having a first elongate edge 31 and an opposite second elongate edge 32, is folded in half such that the first elongate edge 31 is adjacent to the second elongate edge 32, and thereby defining an outside adhesive surface 33 and an inside adhesive surface 34. The folded adhesive tape 30 is then positioned adjacent to the folded second sheet of fabric 21, such that outside adhesive surface 33 and inside adhesive surface 34 are adjacent to the second portion 29 of the inside surface 26 of the second sheet of fabric 21 and to the first portion 28 of the inside surface 26 of the second sheet of fabric 21, respectively; and such that the second elongate edge 32 is positioned between and adjacent to the first and second portions, 28 and 29, of the second sheet of fabric 21, and the first elongate edge 31 is positioned adjacent to the outside surface 25 of the second sheet of fabric 21. The first sheet of fabric 20 is then positioned adjacent to the folded strip of adhesive tape 30 by positioning the elongate edge 24 and outside surface 22 of the first sheet of fabric 20 adjacent to the outside surface 33 of the strip of adhesive tape 30. The seam is formed by utilizing an ultrasonic welding machine, such as a Sonobond® machine, to apply ultrasonic sound pressure to the first and second sheets of fabric, 20 and 21, and to the strip of adhesive tape 30. As noted above, the adhesively bonded seam formed in this manner has the same functional characteristics as the seam formed in accordance with the preferred embodiment.

Figure 5:
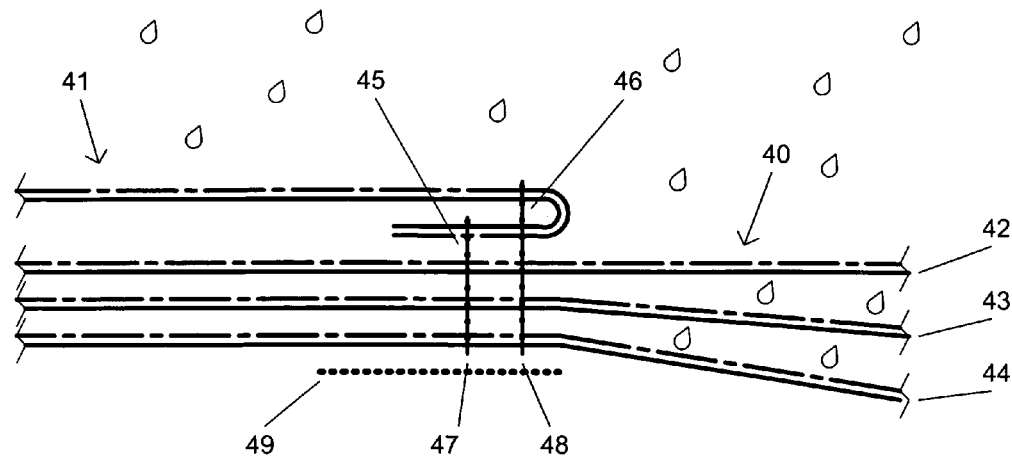
FIG. 5 (PRIOR ART) is a pictorial diagram of a cross-sectional view of a layer of fabric, which has been stitched to a laminated garment having several layers of fabric.

The following discussion pertaining to FIG'S. 5 and 6 illustrates a specific application of the present invention to garments having laminated fabrics. FIG. 5 illustrates the conventional manner in which a layer of fabric for a jacket pocket is stitched to the body of a jacket, constructed from a laminated fabric having several layers of fabric. As shown in the figure, a jacket pocket 41 is attached to the laminated fabric of a jacket body 40, having an outside or facing layer 42 that is abrasion resistant, a middle layer 43 that provides warmth, and an inside or backing layer 44 that is waterproof. The jacket pocket 41 is sewn onto the jacket body 40 by forming a join stitch 45 which extends through an inside portion of the pocket and through all three laminate layers of the jacket. The jacket pocket 41 is further secured to the jacket 40 by forming a top stitch 45 which extends through an outside portion of the pocket, the inside portion of the pocket, and all three laminate layers of the jacket. In an attempt to preserve the waterproof characteristic of the garment, an inside portion 47 of the join stitch 45 and an inside portion 48 of the top stitch 46 are covered or sealed using seam tape 49 in an attempt to prevent moisture (shown in the figure as tear drop shapes), which is wicked by the join stitch 45 and the top stitch 46, from entering the inside of the jacket. Although the seam tape 49 generally prevents the water, which has been wicked by the join stitch 45 and top stitch 46, from entering garment along the inside portions 47 and 48 of the join stitch 45 and top stitch 46, respectively, the water still is able to migrate laterally between the layers of fabric, and ultimately pass through other openings and stitch lines (not shown) through the backing surface 44, compromising the waterproof characteristic of the garment.

Figure 6:
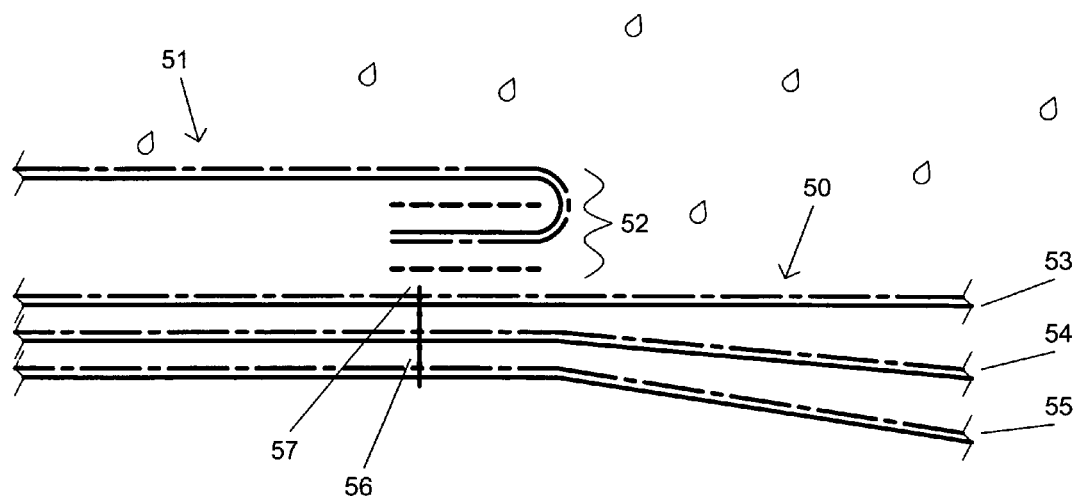
FIG. 6 is a pictorial diagram of a cross-sectional view of a layer of fabric, which has been adhesively bonded, in accordance with the preferred method of the present invention, to a laminated garment having several layers of fabric.

FIG. 6 illustrates the manner in which the present invention can be used to overcome the failure of the conventional seam construction described in connection with FIG. 5 to provide a garment that is waterproof. Using the same example of attaching a jacket pocket to the body of a jacket, a pocket 51 is adhesively bonded to the outside surface 53 of a jacket 50 by utilizing the preferred method of the present invention, as described in connection with FIG. 3, thereby forming a pocket seam 52. The pocket seam 52 attaches the pocket 51 to the jacket 50 such that the seam 52 covers an outside portion 57 of a join seam 56. In this instance, the join seam 56 is not used to attach the pocket 51 to the jacket 50 as in the conventional technique; rather the join seam 56 is only used to bind the jacket's outside or facing layer 53, middle layer 54 and inside or backing layer 55 together where the seam is adhesively bonded to the jacket body. As also shown in the figure, using the present invention to attach the pocket 51 to the jacket 50 eliminates the need for a conventional top stitch because the adhesively bonded seam 52 will not readily separate from the garment when the seam 52 is subjected to a tensile force generally parallel to the surface of pocket 51. Further, the waterproof characteristic of the garment is not compromised because the top stitch has been eliminated and the adhesively bonded seam 52 covers the outside portion 57 of the join stitch 56, preventing water from being wicked by the join stitch 56.

In each of the embodiments described above, the types of adhesive tape that can be used with the method of the present invention include: thermoplastic adhesive film, polyurethane film and polyester film. Further, in addition to using ultrasonic sound pressure, the present invention includes using electromagnetic radiation such as RF (radio frequency) radiation or microwave radiation to heat the strips of adhesive tape in order to form the adhesive bond.

Although the present invention has been described in its preferred embodiment and in certain other embodiments, it will be recognized by those skilled in the art that other embodiments and features may be provided without departing from the scope of the invention, which is defined by the appended claims.

I claim:

1. A method of forming a stitchless seam for a garment, comprising:
    providing a first sheet of fabric having inside and outside surfaces and an edge;
    providing a second sheet of fabric having inside and outside surfaces an edge;
    positioning the outside surface and edge of the first sheet of fabric adjacent to the outside surface and edge of the second sheet of fabric, respectively;
    providing a first strip of adhesive tape having first and second sides and an edge;
    positioning the first strip of adhesive tape between the first and second sheets of fabric such that the edge of the first strip of adhesive tape is adjacent to the edges of the first and second sheets of fabric, and the first and second sides of the first strip of adhesive tape are adjacent to the outside surfaces of the first and second sheets of fabric, respectively;
    providing a second strip of adhesive tape having first and second sides and an edge;

positioning the edge and first side of the second strip of adhesive tape adjacent to the edge and to a first portion of the inside surface of the second sheet of fabric, respectively;

folding the second sheet of fabric such that a second portion of the inside surface of the second sheet of fabric overlaps the second side of the second strip of adhesive tape; and applying energy to the first and second sheets of fabric and to the first and second strips of adhesive tape, whereby the first strip of adhesive tape joins the outside surfaces of the first and second sheets of and the second strip of adhesive tape joins the first and second portions of the inside surface of the second sheet of fabric, thereby forming the stitchless seam.

2. The method of claim 1 in which the inside surface of the second sheet of fabric has a tensile strength which is greater than the tensile strength of the outside surface of the second sheet of fabric.

3. The method of claim 1 in which the inside surface of the first sheet of fabric has a tensile strength which is greater than the tensile strength of the outside surface of the first sheet of fabric.

4. The method of claim 1 in which the inside surfaces of the first and second sheets of fabric are waterproof.

5. The method of claim 1 in which the energy is applied in the form of ultrasonic sound pressure.

6. The method of claim 1 in which the energy is applied in the form of electromagnetic radiation.

7. The method of claim 1 in which the energy is applied in the form of RF radiation.

8. The method of claim 1 in which the energy is applied in the form of microwave radiation.

9. A method of forming a stitchless seam for a garment, comprising:

providing a first sheet of fabric having inside and outside surfaces and an edge;

providing a second sheet of fabric having inside and outside surfaces and an edge;

positioning the outside surface and edge of the first sheet of fabric adjacent to the outside surface and edge of the second sheet of fabric, respectively;

providing a first strip of adhesive tape having first and second sides and an edge;

positioning the first strip of adhesive tape between the first and second sheets of fabric such that the edge of the first strip of adhesive tape is adjacent to the edges of the first and second sheets of fabric, and the first and second sides of the first strip of adhesive tape are adjacent to the outside surfaces of the first and second sheets of fabric, respectively;

applying energy to the first and second sheets of fabric and to the first strip of adhesive tape, whereby the first strip of adhesive tape joins the outside surfaces of the first and second sheets of fabric;

providing a second strip of adhesive tape having first and second sides and an edge;

positioning the edge and first side of the second strip of adhesive tape adjacent to the edge and to a first portion of the inside surface of the second sheet of fabric, respectively;

folding the second sheet of fabric such that a second portion of the inside surface of the second sheet of fabric overlaps the second side of the second strip of adhesive tape; and applying energy to the second sheet of fabric and to the second strip of adhesive tape, whereby the second strip of adhesive tape joins the first and second portions of the inside surface of the second sheet of fabrics, thereby forming the stitchless seam.

10. A method of forming a stitchless seam for a garment, comprising:

providing a first sheet of fabric having inside and outside surfaces and an edge;

providing a second sheet of fabric having inside and outside surfaces and an edge;

folding the second sheet of fabric such that a first portion of the inside surface of the second sheet of fabric is opposite from a second portion of the inside surface of the second sheet of fabric;

providing a strip of adhesive tape having a first edge and a second edge opposite from the first edge;

folding the strip of adhesive tape such that the first and second edges are adjacent to each other;

positioning the folded strip of adhesive tape such that its second edge is between the first and second portions of the second sheet of fabric, and its first edge is adjacent to the outside surface of the second sheet of fabric;

positioning the edge and outside surface of the first sheet of fabric adjacent to the strip of adhesive tape; and applying energy to the first and second sheets of fabric and to the strip of adhesive tape, whereby strip of adhesive tape joins the outside surfaces of the first and second sheets of fabric, and the strip of adhesive tape also joins the first and second portions of the inside surface of the second sheet of fabric.

11. The method of claim 10 in which the inside surface of the second fabric has a tensile strength which is greater than the tensile strength of the outside surface of the second sheet of fabric.

12. The method of claim 10 in which the inside surface of the first sheet fabric has a tensile strength which is greater than the tensile strength of the outside surface of the first sheet of fabric.

13. The method of claim 10 in which the inside surfaces of the first and second sheets of fabric are waterproof.

14. The method of claim 10 in which the energy is applied in the form of ultrasonic sound pressure.

15. The method of claim 10 in which the energy is applied in the form of electromagnetic radiation.

16. The method of claim 10 in which the energy is applied in the form of RE radiation.

17. The method of claim 10 in which the energy is applied in the form of microwave radiation.

18. A stitchless fabric seam for a garment comprising:

a first sheet of fabric having inside and outside surfaces and an elongate edge;

a second sheet of fabric having inside and outside surfaces and an elongate edge, wherein the second sheet of fabric is positioned such that the edge and outside surface of the second sheet of fabric are adjacent to the edge and outside surface of the first sheet of fabric, respectively, and the second sheet of fabric is folded such that a first portion of the inside surface of the second sheet of fabric is opposite from a second portion of the inside surface of the second sheet of fabric;

a first strip of adhesive tape having first and second sides and an elongate edge, the first strip of adhesive tape positioned between the first and second sheets of fabric such that the elongate edge of the first strip of adhesive tape is adjacent to the edges of the first and second sheets of fabric, and the first and second sides of the first strip of adhesive tape are adjacent to the outside surfaces of the first and second sheets of fabric, respectively;

a second strip of adhesive tape having first and second sides and an elongate edge, the second strip of adhesive tape positioned between the first and second portions of the inside surface of the second sheet of fabric such that the edge of the second strip of adhesive tape is adjacent to the edge of the second sheet of fabric, and the first and second sides of the second strip of adhesive tape are adjacent to the first and second portions of the inside surface of the second sheet of fabric, respectively; and applying energy to the first and second sheets of fabric and to the first and second strips of adhesive tape, whereby the first strip of adhesive tape joins the outside surfaces of the first and second sheets of fabric and the second strip of adhesive tape joins the first and second portions of the inside surface of the second sheet of fabric, thereby forming the stitchless seam.

19. The stitchless fabric seam of claim 18 in which the inside surface of the second sheet of fabric has a tensile strength which is greater than the tensile strength of the outside surface of the second sheet of fabric.

20. The stitchless fabric seam of claim 18 in which the inside surface of the first sheet of fabric has a tensile strength which is greater than the tensile strength of the outside surface of the first sheet of fabric.

21. The stitchless fabric seam of claim 18 in which the inside surfaces of the first and second sheets of fabric are waterproof.

22. The stitchless fabric seam of claim 18 in which the energy is applied in the form of ultrasonic sound pressure.

23. The stitchless fabric seam of claim 18 in which the energy is applied in the form of electromagnetic radiation.

24. The stitchless fabric seam of claim 18 in which the energy is applied in the form of RF radiation.

25. The stitchless fabric seam of claim 18 in which the energy is applied in the form of microwave radiation.

26. A stitchless fabric seam for a garment seam comprising:

a first sheet of fabric having inside and outside surfaces and an elongate edge;

a second sheet of fabric having inside and outside surfaces and an elongate edge, wherein the second sheet of fabric is positioned such that the edge and outside surface of the second sheet of fabric are adjacent to the edge and outside surface of the first sheet of fabric, respectively, and the second sheet of fabric is folded such that a first portion of the inside surface of the second sheet of fabric is opposite from a second portion of the inside surface of the second sheet of fabric;

a folded strip of adhesive tape, having a first elongate edge adjacent to a second elongate edge, said adhesive tape positioned adjacent to the first and second sheets of fabric such that the first elongate edge of the adhesive tape is disposed between the outside surfaces of the first and second sheets of fabric and the second edge of the elongate adhesive tape is disposed between the first and second portions of the second sheet of fabric: and applying ultrasonic pressure to the first and second sheets of fabric and to the strip of elongate adhesive tape, whereby strip of adhesive tape joins the outside surfaces of the first and second sheets of fabric, and the strip of adhesive tape also joins the first and second portions of the inside surface of the second sheet of fabric.

27. The stitchless fabric seam of claim 26 in which the inside surface of the second sheet of fabric has a tensile strength which is greater than the tensile strength of the outside surface of the second sheet of fabric.

28. The stitchless fabric seam of claim 26 in which the inside surface of the first sheet of fabric has a tensile strength which is greater than the tensile strength of the outside surface of the first sheet of fabric.

29. The stitchless fabric seam of claim 26 in which the inside surfaces of the first and second sheets of fabric are waterproof.

30. The stitchless fabric seam of claim 26 in which the energy is applied in the form of ultrasonic sound pressure.

31. The stitchless fabric seam of claim 26 in which the energy is applied in the form of electromagnetic radiation.

32. The stitchless fabric seam of claim 26 in which the energy is applied in the form of RF radiation.

33. The stitchless fabric seam of claim 26 in which the energy is applied in the form of microwave radiation.

* * * * *